INVENTORS
MELVIN MARTENS
BY CHESTER G. MUSSON

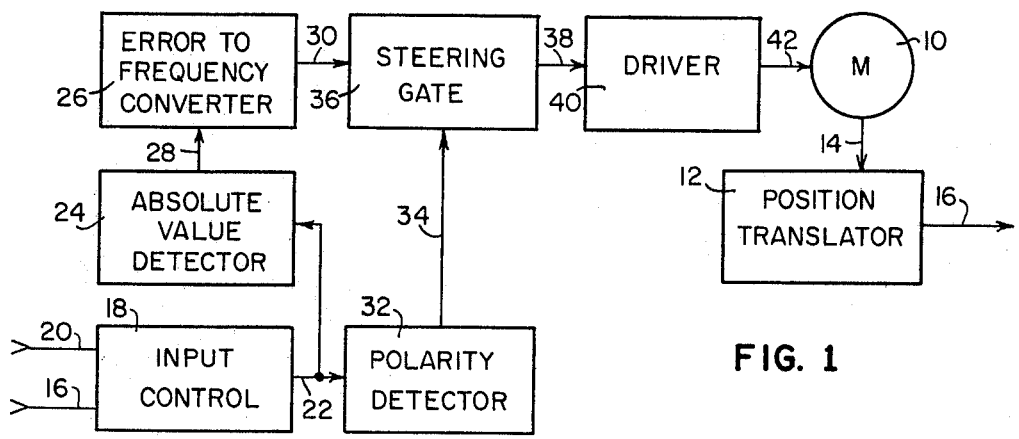
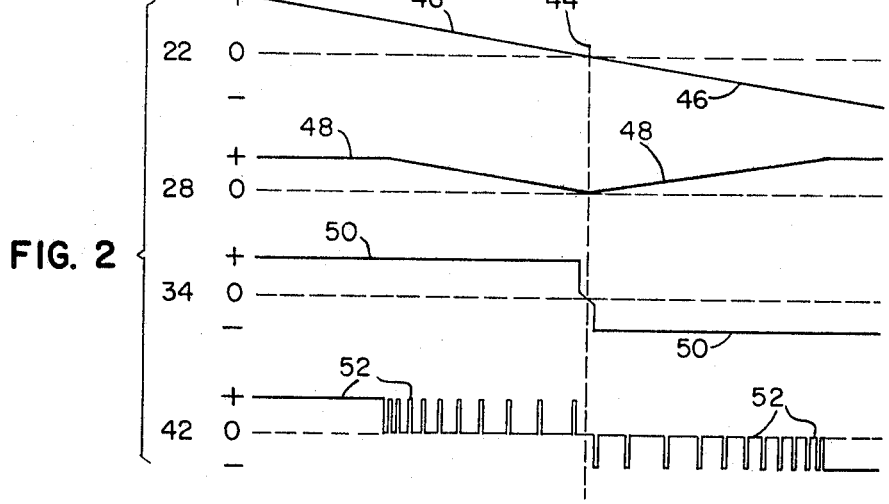
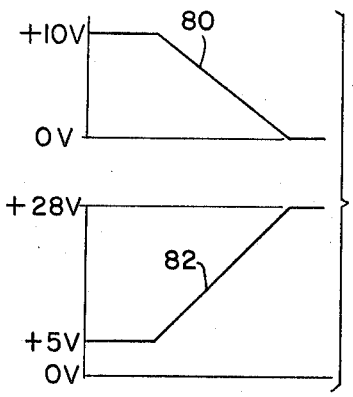
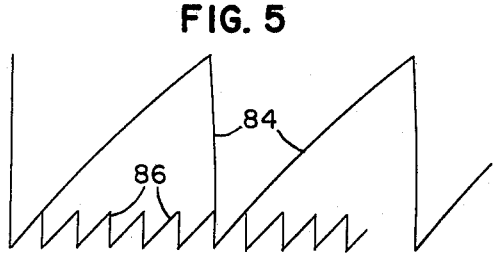

*Silverman & Cass*
ATTYS.

3,487,458
PULSE REPETITION RATE SERVO SYSTEM
Melvin Martens and Chester G. Musson, Oberlin, Ohio,
 assignors to Gilford Instrument Laboratories, Inc.,
 Oberlin, Ohio, a corporation of Ohio
Filed Apr. 25, 1968, Ser. No. 724,112
Int. Cl. H02p 5/06
U.S. Cl. 318—18                                                    15 Claims

ABSTRACT OF THE DISCLOSURE

A servo system which drives a D.C. motor with a train of equal sized and energy applying pulses. The pulse frequency and hence the drive applied to the motor is directly proportional to the magnitude and polarity of an error signal. By appropriate absolute value and error polarity detecting circuitry, the motor is driven with equal increments of constant torque; yet smoothly and precisely without overdrive, hunting or oscillation.

FIELD OF THE INVENTION

This invention relates generally to a servo system for driving a motor at a rate which is proportional to an error signal and, more particularly to a servo system which drives a D.C. motor by a train of pulses whose repetition rate varies proportional to the magnitude and polarity of the error signal, with the amplitude and duration of each pulse remaining fixed so as to drive the motor at a fixed voltage and thus with a constant torque.

The subject servo system is especially well adapted to rapidly respond to input conditions to provide a highly precise translation of mechanisms of numerous varieties. One such use would be to control the slit width of a spectrophotometer.

Known servo mechanisms and systems are of such numerous forms and classes that it would not be appropriate herein to amplify upon them, their contents, disadvantages, etc., to any great extent. However, it is to be noted that most servo systems are subject to the disadvantages of overdrive, hunting, variations in torque, and oscillation.

SUMMARY OF THE INVENTION

The present invention is a relatively simple, primarily electronic, servo control system which drives a D.C. motor with a train of pulses each of equal amplitude and duration so as to apply power proportional to the frequency of the pulses. The pulse frequency is caused to be proportional to an error signal which is derived from a comparison of a control signal with a signal fed back from the output of the motor. The error signal is simultaneously applied to polarity and absolute value detectors and then to an error to frequency converter. The output of the converter is applied to a steering gate which is controlled by the polarity detector. The resulting train of pulses is driven into the D.C. motor, which in turn is linked to a position translator, and thence back to the system input for comparison with the input signal.

Accordingly, it is a primary object of this invention to provide an improved servo system for driving a D.C. motor with a constant voltage and, hence, constant torque.

Another object of this invention is to drive a D.C. motor in equal increments at a variable rate with a train of equal pulses having a variable repetition rate.

A further object of this invention is to drive a D.C. motor at a rate proportional to an error signal; yet, without overdrive, hunting, or oscillation.

Other objects and advantages of this invention will become apparent to those skilled in the art from the accompanying detailed description taken in conjunction with the following drawings.

BRIEF DESCRIPTION OF THE DRAWINGS

FIG. 1 is a block diagram of the subject system;
FIG. 2 is a group of related voltage waveforms at different points of the system shown in FIG. 1;
FIG. 4 is a graph which compares the voltage waveforms of error and response in one portion of the error to frequency converter block of the subject system;
and
FIG. 5 is a graph which designates responses to two different error conditions in a second portion of the error to frequency converter block.

DESCRIPTION OF THE PREFERRED EMBODIMENT

Figure 3:
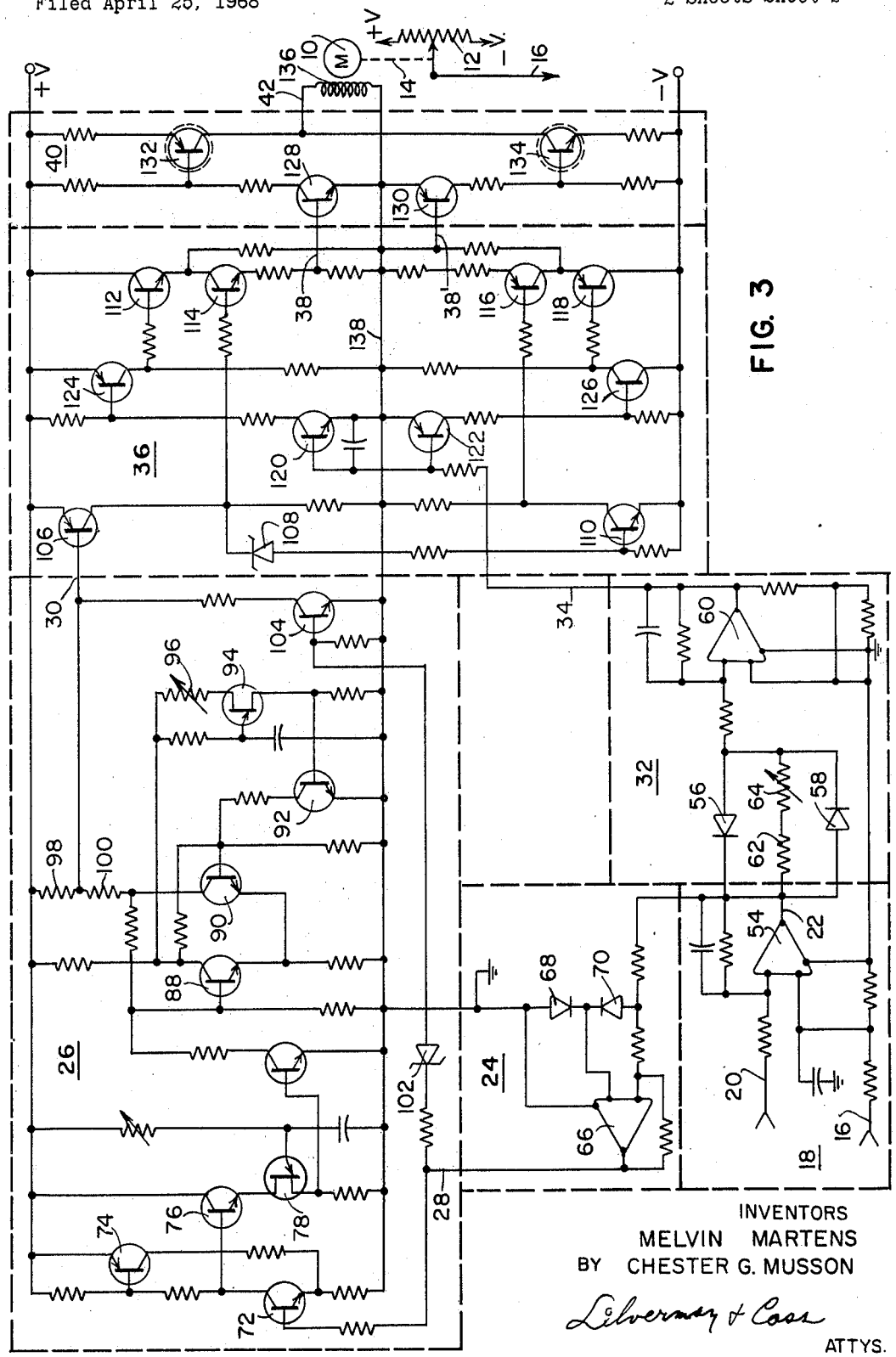
FIG. 3 is an electrical schematic of a preferred form of the subject system.

With reference to FIG. 1, there is shown a servo system for applying a selectively rotative drive to a D.C. motor 10. The motor by linkage, not shown, would be employed to precisely operate any of a variety of instruments, elements, or the like, also not shown. One such operated element could be the slit width control for a spectrophotometer. A position translator 12 is coupled by a connection 14 to an output of the motor 10 and is responsive at its output 16 to the extent and direction of rotation of the motor.

An input control circuit 18 has as one of its inputs the output 16 from the position translator. The control circuit has a second input 20, which is coupled to the source of a control signal. The primary function of the input control circuit is to provide a summing junction in which the motor position and control signals are compared and their difference amplified for use as an error signal output on a line 22.

An absolute value detector 24 receives the error signal from the line 22 and responds with an absolute voltage value which varies from zero voltage to positive saturation according to and proportional to the magnitude of the error signal.

An error to frequency converter 26 is connected by a line 28 to the output of the absolute value detector. Through coaction of several stages within the converter 26, there is sequentially developed a trigger signal proportional to the error input to the converter, a series of trigger pulses having a frequency proportional to the trigger signal, and a train of equal sized pulses having a repetition rate proportional to the frequency of the trigger pulses; hence, proportional to the error input to the converter 26. In the event of an especially large error condition, the converter is adapted to bypass its pulse producing stages and, in lieu thereof, generates a maximum drive output signal on its output channel 30.

A polarity detector 32 also is connected to the output of the input control circuit 18. Not only does this detector identify the polarity of its error input, it is provided with a dead band circuit to enhance the separation of the signals of opposite polarity as they approach the null or zero level from either direction.

Coupled to the outputs of the polarity detector and the error to frequency converter by a channel 34 and the channel 30, respectively, is a steering gate 36. The gate 36 has a pair of parallel gating circuits each responsive to control by one or the other polarity of the error signal. Thus, the output train of pulses from the steering gate on the line 38 is proportional to the polarity as well as the magnitude of the error condition.

A driver 40 receives the output from the steering gate, amplifies it, and applies it to the motor 10, via a line 42, to complete the system. The greater the frequency of the pulses applied to the motor 10, the more rapid will be its rotation; however, since each pulse delivers the same power, the applied torque is constant and each pulse elicits an equal rotation of the motor. This factor will become increasingly clear with consideration of the next described figures.

FIG. 2 depicts voltages at the four different locations of FIG. 1 designated at the left edge of the respective waveforms. For ease of description, it is to be assumed that the connection 14 between the motor and the position translator is disconnected and the translator is moved manually and smoothly from the positive error to negative error condition. Intermediate these two error conditions is a null point diagrammatically shown in FIG. 2 by the vertical dashed line 44.

At the control circuit output 22, a uniformly sloped waveform 46 is generated as shown. As a result, an output waveform 48 from the absolute value detector at line 28 is initially horizontal and maximum, as a result of saturation of the detector; then, the waveform slopes to zero at the null point. The response to an increased negative error is a mirror image of the positive error response. A waveform 50 represents the output of the polarity detector on the channel 34 and is at a maximum level, positive or negative, except proximate to the null point 44. As earlier mentioned, the polarity detector 32 possesses dead band circuitry; hence and as illustrated, the waveform 50 decays to zero prior to attainment of the null point.

As a consequence of the waveforms 48 and 50, an input waveform 52 is applied to the motor on the line 42. To the left or positive side of the null point 44 the waveform 50 is positive, since the polarity detector waveform is correspondingly positive. To the right of the null point, the waveform 52 is necessarily negative; hence, the motor 10 is being driven in the opposite direction. During the time that the absolute value detector is providing a maximum positive or negative input, the waveform 52 is in the form of an uninterrupted level and will drive the motor at a maximum rate. This is a result of the bypass conditioning of the converter. As the output of the absolute value detector decreases toward zero, the waveform 52 attains a pulsed format with a decreasing repetition rate, such that at the proximate to the null point no drive is being applied to the motor. Since each of the drive pulses is of the same size, a fixed torque is being applied to the motor even as the rate of response decreases due to the reduced frequency of the drive pulses. Of course, the negative side of the waveform 52 is the inverted mirror image of the positive half.

Turning next to FIG. 3, in which the blocks of FIG. 1 are designated by dashed rectangles bearing the same reference numerals and all other similar portions are numbered the same, a preferred system schematic is shown. Inasmuch as most of the resistors and capacitors provide typical coupling, isolating and reference setting functions per se well known in the art, they will not be discussed or enumerated.

The input control circuit 18 has as its primary element a differential amplifier 54, having as its inputs the lines 16 and 20, and as its output the line 22 which carries the amplified error signal, i.e., the signal which is the difference between the feedback signal on the line 16 and the control signal on the line 20. Depending upon the polarity of the error signal on the line 22, it passes through one or the other of a pair of oppositely poled diodes 56 and 58 in the polarity detector 32 and is coupled to one input of an amplifier 60. The amplifier 60 operates as a saturating switch whose output on the channel 34 has a polarity depending upon the polarity of its input error signal. Parallel to the diodes 56 and 58 are a pair of resistors 62 and 64, the latter being adjustable, for biasing the diodes such that proximate the null point voltage neither diode will conduct. As a result, the waveform 50 in FIG. 2 is attainable.

The absolute value detector 24 has as its primary element an amplifier 66, which has one input coupled to the output line 22 from the differential amplifier 54, and has another input connected to a pair of oppositely poled diodes 68 and 70, which enable an absolute value input response independent of the polarity of the error signal on the line 22. If the absolute value of the error signal is in excess of a certain level, the amplifier is driven into positive saturation, as shown in the horizontal portions of the waveform 48 in FIG. 2. Smaller error signal levels cause a proportionally lower output from the amplifier 66 until, at the null point, the output on the line 28 is at zero voltage.

At the input end of the error to frequency converter 26 is a control amplifier stage comprising three transistors 72, 74 and 76 coupled such that the base of the transistor 72 receives the absolute value signal from the line 28, the transistor 74 provides negative feedback to the emitter of the transistor 72, and the transistor 76 transmits an inverted and gain controlled signal to a unijunction 78. Once again the input to output is proportional to the error signal.

The specific input to output relationship of this input stage is shown in FIG. 4, in which the waveform 80 represents the signal at the base of the transistor 72, and the waveform 82 represents the signal output from the emitter of the transistor 76. Assuming, for example, that the power supply to this servo system provided ±28 volts, which is designated +V and —V at the right end of FIG. 3, it will be seen from FIG. 4 that in the absence of an error signal, i.e., when there is a zero voltage level on waveform 80, the emitter of the transistor 76 will supply a maximum output of nearly +28 volts. As the error signal increases, the output from the transistor 76 proportionally decreases to a low level, such as +5 volts.

The effect of the variable output from the transistor 76 is to proportionally vary the operation of the unijunction 78 in an inverse manner, as illustrated in FIG. 5. According to the design criteria, the unijunction 78 is a stage which produces a train of trigger pulses having a frequency directly proportional to the error signal. Thus, when the error signal changes from zero toward +10 volts and the unijunction input changes from +28 volts toward only +5 volts, the interbase voltage of the unijunction is altered and, as a result, its firing voltage is reduced so that it fires more rapidly. This relationship is emphasized in FIG. 5 in which a waveform 84 represents the low frequency trigger pulses enabled by a small error signal and a correspondingly large base input; and a waveform 86 represents a high frequency train of trigger pulses elicited by a large error signal and the associated low valued base input to the unijunction.

Returning to FIG. 3, the output from the trigger stage unijunction is coupled to the next stage, which is a bistable device primarily comprising a pair of transistors 88 and 90 coupled in the mode of a self-resetting flip-flop which operates as a one shot element. Also within this stage is a resetting transistor 92 and an output pulse width presetting control unijunction 94 and resistor 96 combination. The uniform width and amplitude pulses from the collector of the transistor 90 are taken from between a pair of load resistors 98 and 100 and applied to the channel 30. Accordingly, there is generated by this bistable stage a train of uniform pulses having a repetition rate proportional to the error signal.

Coupled between the output channel 30 and the input line 28 and parallel to the aforementioned stages of the error to frequency converter 26 is series coupled Zener diode 102 and a transistor 104. In combination these elements provide a full drive bypass amplifier which, when the input error is of sufficiently large magnitude to positively saturate the amplifier 66 in the absolute value detector 24, operates with the Zener diode reverse biased and the transistor 104 heavily conducting to provide a constant level drive signal on the channel 30. Such signal is not pulsed and is the origin of the extreme ends of the drive waveform 52 in FIG. 2.

The channel 30 is connected to the base of a transistor 106 which forms one input to the steering gate 36. By way of a Zener diode 108, the transistor 106 drives a transistor 110. In this manner both the transistors 106 and 110 saturate when the flip-flop transistor 90 is conducting or the bypass Zener diode 102 is in its avalanche condition. The steering gate includes a positive polarity AND gate comprising transistors 112 and 114 and a negative polarity AND gate comprising transistors 116 and 118. Coupled as illustrated, the transistor 106 applies the derived signal from the channel 30 to the base of the transistor 114, and the transistor 110 applies the same signal to the base of the transistor 116. At this juncture, however, neither AND gate is enabled.

The channel 34 from the polarity detector is coupled to the bases of a pair of oppositely oriented transistors 120 and 122, only one of which will become conductive, depending upon the polarity of the error signal on the channel 34. The one conducting transistor applies its output to an associated one of a pair of signal inverting transistors 124 and 126, which feed respectively the transistors 112 and 118 to enable their respective AND gate. In this manner the polarity of the error signal operates the steering gate to transmit from the input channel 30 to one of the output lines 38 or 38' the waveform 52 designated in FIG. 2. It will be appreciated that the output on the line 38 will be positive and the output on the line 38' will be negative. In FIG. 1 the reference numeral 38 represents both lines 38 and 38' of FIG. 3.

The output lines 38 and 38' feed, respectively, inverting transistors 128 and 130 in the driver 40 and in turn enable the one of a pair of amplifying transistors 132 and 134, both of which have their collectors connected to the output line 42.

The motor 10 has its field coil 136 coupled between the bipolar output line 42 and a grounded line 138 such that the drive signal 52 will impart polarity oriented power drive to the motor armature proportional to the input error signal 46. As a result, whatever device is connected to the motor is driven in a precise manner.

The motor also drives the position translator 12, which can be a potentiometer, as illustrated, that supplies a proportional feedback signal on the line 16 to the input control circuit amplifier 54.

Inasmuch as the train of drive pulses diminishes in frequency in the direction of the null point and cannot be generated proximate thereto because of the dead band, overdrive and hunting of the motor are eliminated, as is oscillating. By providing a fixed voltage, equal increments of constant torque is supplied to the D.C. motor. The speed of the response is enhanced by the full drive bypass, which does not vary the applied torque. By suitable adjustment of component parameters in the converter, the pulse width and frequency can be scaled to meet required motor output conditions.

Thus it will be seen that the disclosed servo system is an especially precise, rapidly reacting, closed loop, yet relatively simple and compact apparatus which more than meets the initially presented objects.

It is believed that this inventive system has been described in sufficient detail to enable those skilled in the art to understand and practice its teachings and at the same time enables those skilled to appreciate the possibility of variations which would be of value to their specific needs, while at the same time would lie within the spirit and scope of this invention.

What is desired to be secured by Letters Patent of the United States is:

1. A servo system for driving a motor with constant torque and at a rate and direction proportional to the magnitude and polarity of an error signal comprising
   a D.C. motor,
   an input control having a plurality of inputs and at least one output,
   said input control adapted to operate upon signals applied to said inputs and to drive therefrom an error signal having as significant parameters polarity and magnitude,
   an error to frequency converter coupled to said input control and adapted to generate a monopolar signal of constant amplitude, at least a portion of which is of pulsed format having a repetition rate proportional to said error signal, and
   polarity responsive means coupled to one output of said input control, coupled to receive said monopolar signal, and adapted to deliver to said motor said monopolar signal having a polarity determined by the polarity of said error signal.

2. A servo system as defined in claim 1 in which
   a motor position translator is interposed between said motor and said input control and provides one of said applied signals in a feedback mode.

3. A servo system as defined in claim 2 in which said input control comprises
   a differential amplifier which is responsive to the magnitude and polarity of the signal from said position translator in comparison with a control signal which is applied to one of said inputs.

4. A servo system as defined in claim 1 in which said polarity responsive means comprises
   a polarity detector coupled to said one output of said input control,
   a steering gate,
   a first input of said steering gate being coupled to an output of said polarity detector,
   a second input of said steering gate being coupled to an output from said error to frequency converter, and
   a dead band circuit within said polarity detector for inhibiting the operation of said steering gate proximate the presentation of a null voltage point of said error signal.

5. A servo system as defined in claim 4 in which said steering gate comprises
   a first and a second AND gate each having one input coupled to said first steering gate input and each having another input coupled to said second steering gate input such that at any one time only one of said AND gates is capable of being enabled by said polarity detector, depending upon the polarity of its output to said first input.

6. A servo system as defined in claim 5 in which
   a signal driver is interposed between the output of both said AND gates and the field coil of said motor,
   the pulses derived from said monopolar signal and driven by said signal driver being equal in size and driving said motor in equal increments.

7. A servo system as defined in claim 1 in which
   an absolute value detector is interposed between the output of said input control and said error to frequency converter, and
   a saturating amplifier is a primary element of said absolute value detector.

8. A servo system as defined in claim 7 in which said error to frequency converter comprises
   a plurality of series coupled stages, and
   a full drive bypass amplifier parallel to the combined stages,
   said full drive bypass amplifier adapted to be enabled upon the saturation of said saturating amplifier upon the occurrence of an error signal greater than a predetermined value.

9. A servo system as defined in claim 1 in which said error to frequency converter comprises
   a trigger pulse stage for producing a train of trigger pulses having a frequency dependent upon the magnitude of said error signal, and a bistable device for operating upon said trigger pulses to provide a train of drive pulses of equal amplitude and duration.

10. A servo system as defined in claim 9 in which only one side of said bistable device has its output coupled to said polarity responsive means for delivery of said drive pulses to said motor.

11. A servo system as defined in claim 9 in which said error to frequency converter further comprises a controlled gain input stage which provides an output signal proportionally inverse to said error signal, and said trigger pulse stage comprises an element which is responsive to such inverse proportionality to provide the train of trigger pulses with a frequency which is directly proportional to the magnitude of the error signal.

12. A servo system as defined in claim 11 in which said error to frequency converter further comprises a signal bypass connected between the input to said controlled gain stage and the output of said bistable device for inhibiting the generation of said train of drive pulses and for generating a drive signal level equal to said drive pulses.

13. A servo system as defined in claim 12 in which a Zener diode is included within said signal bypass such that said bypass is enabled when said Zener diode is in its avalanche condition, and a unijunction transistor comprises the primary element in said trigger pulse stage.

14. A servo system as defined in claim 12 in which an absolute value detector is interposed between the output of said input control and said error to frequency converter and is coupled to said controlled gain stage and said signal bypass for selectively enabling one or the other of them, and a motor position translator provides a feedback signal from said motor to one of the inputs of said input control.

15. A servo system as defined in claim 14 in which said polarity responsive means comprises a polarity detector coupled to said one output of said input control, and a steering gate interposed between said polarity detector, said error to frequency converter and said motor, said steering gate having a pair of parallel paths, selectable by said polarity detector dependent upon the polarity of said error signal.

References Cited

UNITED STATES PATENTS 3,260,912 7/1966 Gregory.
3,348,108 10/1967 D'Onofrio _____ 318—29 XR
3,364,405 1/1968 Henderson _____ 318—18

BENJAMIN DOBECK, Primary Examiner

U.S. Cl. X.R.
318—28, 30